April 15, 1941.  B. H. FREEDMAN  2,238,724
TICKET
Filed Nov. 13, 1939
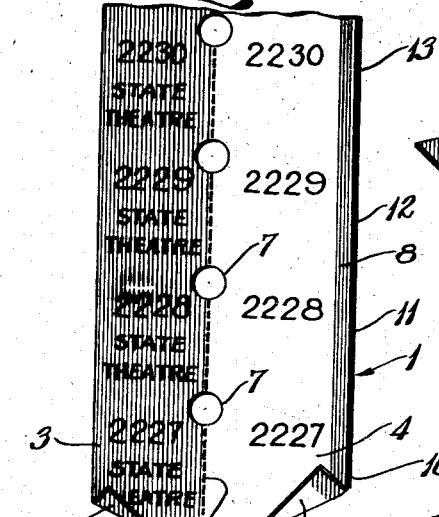
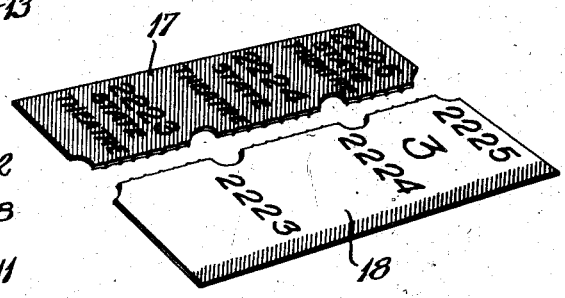
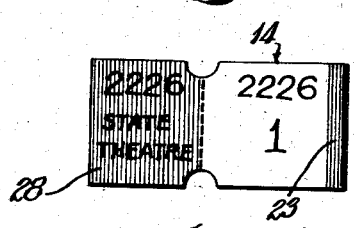
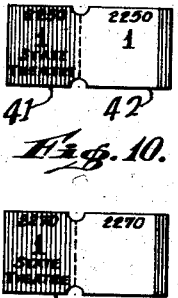
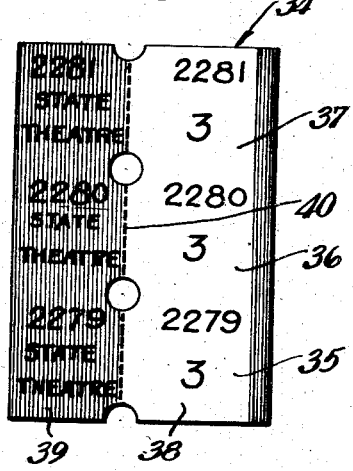
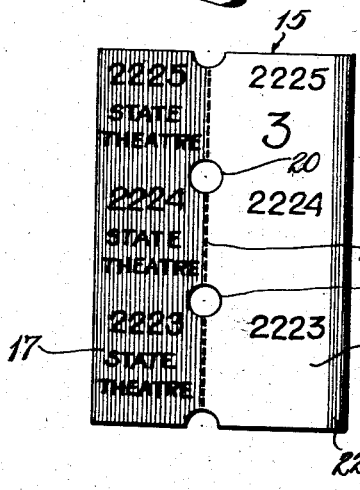
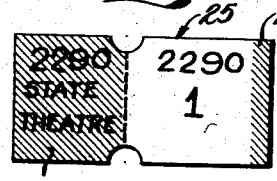
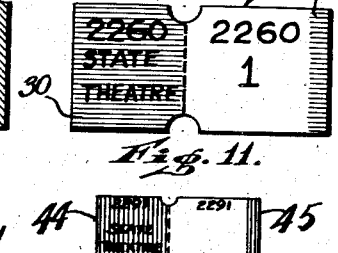
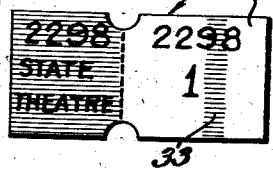
INVENTOR
BENJAMIN H. FREEDMAN
BY
ATTORNEY Patented Apr. 15, 1941

2,238,724

UNITED STATES PATENT OFFICE 2,238,724

TICKET

Benjamin H. Freedman, Asbury Park, N. J.

Application November 13, 1939, Serial No. 303,938

15 Claims. (Cl. 283—53)

This invention relates to an improved ticket.

Among the objects of the present invention, it is aimed to provide an improved theatre ticket in size equaling a multiple of a predetermined unit, and the multiple equaling the number of patrons to be admitted on the ticket, and in addition, each ticket having two stub areas, one stub area to be retained for the accounting department of the theatre, and the other stub area to be handed to the patron, and marking on the stub area to be retained according to the price thereof to facilitate the accounting department in auditing the same and to distinguish the stub area to be retained from the stub area to be handed to the patron.

It is still another object of the present invention to provide an improved theatre ticket in size equaling a multiple of a predetermined unit, and the multiple equaling the number of patrons to be admitted on the ticket, and in addition, each ticket having two substantially rigid or shape-retaining stub areas, one stub area to be retained for the accounting department and the other stub area to be handed to the patron, and a marking on the stub area to be retained according to the price thereof to facilitate the accounting department in auditing the same and to distinguish it from the other stub area to obstruct palming.

It is still another object of the present invention to provide an improved theatre ticket in size equaling a multiple of a predetermined unit, and the multiple equaling the number of patrons to be admitted on the ticket, and in addition, each ticket having two substantially rigid or shape-retaining stub areas, one stub area to be retained for the accounting department and the other stub area to be handed to the patron, markings on the stub areas to distinguish one from the other to obstruct palming or the like, and a marking on the stub area retained with a mark corresponding to the marking on the stub area to be handed to the patron and likewise corresponding to the price thereof to facilitate the accounting department in auditing the same.

It is still another object of the present invention to provide an improved theatre ticket which will materially obstruct palming, if not entirely eliminate it, which is characterized by a row of pairs of stub areas, one set of stub areas to be retained by the theatre for the accounting department, and the other set of stub areas to be handed to the patron, the number of pairs of stub areas of each ticket corresponding to the number of patrons to be admitted on the ticket.

It is still another object of the present invention to provide an improved theatre ticket which will materially obstruct palming, if not entirely eliminate it, which is characterized by a row of pairs of stub areas, one set of stub areas to be retained by the theatre for the accounting department, and the other set of stub areas to be handed to the patron, the number of pairs of stub areas of each ticket corresponding to the number of patrons to be admitted on the ticket, in which the stub areas to be handed to the patron are distinctively colored on both faces, not only to distinguish from one another but also to indicate the price per person, and the stub areas to be retained having markings thereon corresponding in color to the color of the stub areas to be handed to the patron and designating the number of patrons to be admitted on the ticket to facilitate the accounting department in auditing, not only with respect to the number of patrons for which the tickets have been collected, but also with respect to the price per person of the ticket.

These and other features, capabilities, and advantages of the invention will appear from the subjoined detail description of specific embodiments thereof illustrated in the accompanying drawing, in which Figure 1 is a fragmental plan of a portion of a strip of tickets before a ticket has been marked and dispensed from the same;

Figs. 2 and 3 are plans of tickets marked and dispensed according to the present invention;

Fig. 4 is a perspective of the ticket shown in plan in Fig. 3 torn into its respective stub areas after the ticket has been sold;

Fig. 5 is a plan of another ticket made according to the present invention;

Figs. 6 and 7 are plan views of tickets having different color markings thereon as distinguished from the color markings of Figs. 2, 3 or 5, as an instance, to determine different prices;

Fig. 8 is a plan of a ticket showing still a different marking made according to the present invention; and Figs. 9, 10 and 11 show different embodiments on a smaller scale of the ticket illustrated in Fig. 2.

A ticket strip 1 such as illustrated in Fig. 1 shows the advance end of the strip as the edge 2 from which the ticket last dispensed has been cut by a machine such for instance as illustrated in my co-pending application Serial No. 293,169, filed September 2, 1939. This ticket consists essentially of the two stub areas 3 and 4, the stub area 3 in the present instance having a distinctive color such as red preferably on both sides of the strip 1, see the corner 5 and the printed matter "State Theatre" thereon. This stub area 3 is defined from the stub area 4 in the present instance by the demarcation 6 which may either be merely the demarcation formed between the color of the area 3, red in the present instance, and the color of the area 4, white in the present instance, or a printed line, or a scored or perforated line, or else as shown in Fig. 1, a demarcation 6 intersected by the feed pin receiving holes 7. The area 4 likewise preferably has the same color on both faces, and has in addition a border marking 8 formed on both faces, see the turned-over corner 9.

According to the invention disclosed in my co-pending application aforesaid, the successive pairs of stub areas 10, 11, 12 and 13 are defined from one another by successive serial numbers such as the serial numbers 2227, 2228, 2229 and 2230, and in addition in the present instance, have the pin receiving openings 7 intersecting the boundary between the successive pairs of stub areas 10, 11, 12 and 13.

If the ticket to be dispensed from the strip 1 is intended for admitting a single patron, then the knife cut would intersect in the present instance the first opening 7 between the areas 10 and 11. The ticket 14 illustrated in Fig. 2 is illustrative of a ticket intended for the admission of a single patron, and the serial 2226 impressed on ticket 14 indicates as an instance that it was dispensed from the strip 1 by a knife cut along the edge 2 to separate this ticket 14 from the pair of stub areas 10, bearing the serial number 2227.

According to the invention illustrated in the aforesaid co-pending application, the numeral "1" on ticket 14 may be impressed thereon when dispensing such ticket 14 to indicate that it is issued for the admission of a single patron, although the numeral "1" can be omitted without departing from the spirit of the invention, since the size of the ticket 14 corresponding to a single stub area length alone would determine the number of patrons to be admitted on a ticket without the use of the numeral "1."

In Fig. 3, there is shown a ticket 15 in length corresponding to the three unit areas and bearing the serial numbers 2223, 2224, and 2225, as compared to the serial number 2226 on ticket 14. The serial numbers of the ticket 15 would indicate that this ticket was dispensed before the ticket 14 was dispensed and that the ticket 14 as compared to the strip 1, was the last ticket dispensed, the next unit area 10 bearing the serial number 2227 of the strip 1, see Fig. 1.

The ticket 15 is characterized by having the same red colored stub area 17, and the same white colored stub area 18 as the areas 3 and 4 of the strip 1. Likewise, the transversely extending unit areas are distinguishable from one another by an imaginary line intersected by the feed pin receiving openings 19 and 20, the feed pin receiving opening 19 contributing in the present instance to aid in defining the unit area 2223 from the unit area 2224, and the feed pin receiving opening 20 contributing in the present instance to aid in defining the unit area 2224 from the unit area 2225.

Furthermore, as shown in each of the several figures of the drawing, and as specified in my co-pending application for patent, Serial No. 293,169 above referred to, the stub area reserved for the theatre, as an instance the area 18 of Fig. 4, is broader than the area 17 so that the rigidity of the cut ticket strip may be enhanced and sufficient body provided to facilitate handling, and so that in addition it will make it more difficult to divide this broader stub area into one or more parts without visible evidence of the act of partitioning the stub area or tell-tale mark on the stub area itself of the wrongful partitioning of the stub area.

A ticket such as the ticket 15 can readily be distinguished from the ticket 14 by its length to determine the number of patrons for which it was issued so that the doorman with or without the numeral "3" or "1" can quickly determine the number of patrons for which the ticket was issued as an instance by the number of stub areas determined by the serial numbers. On the other hand, to facilitate checking the honesty of the ticket collector, the stub area 17 may be required to be handed to the patron, and the area 18 required to be retained for the accounting department. In this way, in the first place, so-called palming according to the practice heretofore followed, is prevented. With the tickets heretofore in use, where both stub areas of the ticket are the same color, the doorman could hand one stub area to the first patron, retain the other stub area of the first ticket and upon receiving a second ticket from a second patron, hand him the stub area retained from the first ticket received, and not tear the second ticket into its stub areas but retain it for resale. With the present ticket, this form of fraud can of course be entirely prevented.

In the next place, since the longer ticket, as for instance the ticket 15, is not readily foldable and on the other hand is weakened along the line 21 defining the stub areas 17 and 18 from one another, at least by the rows of pin receiving openings such as the openings 19 and 20, which demarcation 21 may also be perforated as illustrated, the doorman will find it expedient to grip the stub areas 17 in one hand and the stub areas 18 in the other hand and then tear the ticket 15 into its respective areas 17 and 18, see Fig. 4, without first folding the same. With this practice adopted, an inspector or watcher in the lobby of the theatre can quickly detect whether the doorman is properly tearing the tickets received and handing the proper stub areas, as an instance the areas 17, to the patrons and depositing the stub areas 18 into the ticket chopper or the like. The lack of a prepared line, scoring, perforation or the like between successive unit areas, as an instance between the areas 10 and 11, and only a weakening demarcation between the adjoining stub areas, will of course guide the doorman in properly tearing the tickets collected and obstruct any tendency to split a long ticket intended for the admission of several patrons into a shorter ticket intended for the admission of a smaller number of patrons in the interest of fraud.

Furthermore, by means of the present invention, the auditing department can quickly sort the tickets of a common size as an instance, and if the tickets in addition have numbers on the ends thereof such as the number "3" on ticket 15 to indicate the number of patrons for which the ticket is issued, the auditing department can quickly check whether or not the stub areas correspond to the number of patrons for which the tickets have been issued.

Still furthermore, if the stub area 18 has a marking or code such as the border 22 to indicate the price for which the ticket is issued, the auditing department can quickly sort the stub areas of a common price and thus quickly determine the number of tickets of each price that have been issued. As an instance, it has been the custom in some theatres to issue a ticket of one price, say ten cents for the session up to 2 p. m., a ticket of a higher price for the session between 2 p. m. and 6 p. m., and a ticket for still a higher price for the session from 6 p. m. to the closing hour. In such instance, the coloring of the marking as an instance the border 22 on the ticket 15 may be red and disposed adjacent to the outer longitudinal edge to designate a ten cent ticket, the marking of the tickets to be issued for the session between 2 and 6 p. m. to indicate a twenty cent ticket may be green, see the border 24 of the ticket 25 illustrated in Fig. 6, and the marking on the tickets issued for the session between 6 p. m. and closing hour may be blue, see the border 26 of the ticket 27 illustrated in Fig. 7. Preferably as illustrated, the color of the border corresponds to the color of the stub area retained by the patron, see for instance the red color of the border 23 and stub area 28 of the ticket 14, the green color of the border 24 and the stub area 29 of the ticket 25, and the blue color of the border 26 and stub area 30 of the ticket 27.

The marking or code such as the markings 22, 23, 24 and 26 need not necessarily consist of a border line along the edge of the stub area to be retained, but may consist of any suitable distinguishing marking readily detected by an inspection of such stub areas. In Fig. 8, as an instance, the stub area 31 of the ticket 32 to be retained has a marking consisting of a blue strip 33 extending across the stub area 31 spaced from the longitudinal edge thereof instead of adjacent to the longitudinal edge thereof as is the case with the code 22, so that the codes or markings may not only distinguish one from the other by color but also by position relative to the longitudinal edge of the strip to determine the price of the ticket, the day when issued, and/or the time of day when issued.

In the embodiment illustrated in Fig. 5, there is illustrated a ticket 34 marked substantially the same as tickets 14 and 15 with the one exception that the successive transverse areas 35, 36, 37 marked with the serial numbers 2279, 2280 and 2281 have each marked in the stub area to be retained by the theatre, as an instance, the successive stub areas 38, a number corresponding to the number of patrons for which the ticket is to be dispensed, the ticket 34 having three successive transverse areas 35, 36 and 37 intended for the admission of three patrons each having the numeral "3" impressed in the stub areas 38 of these successive transverse areas 35, 36 and 37. The stub areas 38 as distinguished from the stub areas 39 of course constitute a single stub area when torn in half along the line 40, see as an instance the stub area 18 as distinguished from the stub area 17 of Fig. 4.

In the embodiment illustrated in Fig. 9, the numeral, as an instance the numeral "1" indicating the number of patrons for which the ticket is issued, is marked in each stub area 41 and 42; in the embodiment illustrated in Fig. 10, the numeral, as an instance the numeral "1," indicating the number of patrons for which the ticket is issued, is marked only in the stub area 43 to be handed to the patron, and in the embodiment illustrated in Fig. 11, neither of the stub areas 44 and 45 are marked with a number to indicate the number of patrons for which the ticket is issued, the size alone here being depended upon to indicate the number of patrons for which the ticket is issued.

It is obvious that various changes and modifications may be made to the details of the tickets without departing from the general spirit of the invention set forth in the appended claims.

I claim:

1. A ticket composed of a shape retaining material having two smooth longitudinally extending edges and a weakened line extending only longitudinally of and intermediate said longitudinally extending edges dividing the ticket into two columns of stub areas equal in length to one another, the ticket being more rigid and less bendable in all directions transverse to said weakened line and having smooth transversely extending edges separating successive tickets from one another, each ticket as initially issued corresponding in size to a multiple of transversely extending unit areas corresponding in number to the number of patrons for which the ticket is issued, portions of the ticket being apertured at predetermined intervals for controlling the feed of the successive unit areas and defining the successive unit areas from one another, the weakened line defining the division along which the ticket is to be separated into its respective stub areas and facilitating separating the ticket along such line into its respective stub areas, said ticket possessing a stiffness in a longitudinal direction sufficient to render it difficult manually to divide its associated set of successive unit areas issued as a ticket without visible evidence of the act of partitioning the ticket.

2. A ticket composed of a shape retaining material having two smooth longitudinally extending edges and a weakened line extending only longitudinally of and intermediate said longitudinally extending edges dividing the ticket into two columns of stub areas equal in length to one another, the ticket being more rigid and less bendable in all directions transverse to said weakened line and having smooth transversely extending edges separating successive tickets from one another, each ticket as initially issued corresponding in size to a multiple of transversely extending unit areas corresponding in number to the number of patrons for which the ticket is issued, portions of the ticket being removed at predetermined intervals for controlling the feed of the successive unit areas and indicia on the ticket defining the successive unit areas from one another, the weakened line defining the division along which the ticket is to be separated into its respective stub areas and facilitating separating the ticket along such line into its respective stub areas, said ticket possessing a stiffness in a longitudinal direction sufficient to render it difficult manually to divide its associated set of successive unit areas issued as a ticket without visible evidence of the act of partitioning the ticket.

3. A ticket composed of a shape retaining material having two smooth longitudinally extending edges and a weakened line extending only longitudinally of and intermediate said longitudinally extending edges dividing the ticket into two columns of stub areas equal in length to one another, the predominant color on one column being strikingly different from the predominant color on the other column, the ticket being more rigid and less bendable in all directions transverse to said weakened line and having smooth transversely extending edges separating successive tickets from one another, each ticket as initially issued corresponding in size to a multiple of transversely extending unit areas corresponding in number to the number of patrons for which the ticket is issued, portions of the ticket being apertured at predetermined intervals for controlling the feed of the successive unit areas and defining the successive unit areas from one another, the weakened line defining the division along which the ticket is to be separated into its respective stub areas and facilitating separating the ticket along such line into its respective stub areas, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have at least three smooth edges to cooperate with the color thereof readily to distinguish one stub area from the other.

4. A ticket composed of a shape retaining material having two smooth longitudinally extending edges and a weakened line extending only longitudinally of and intermediate said longitudinally extending edges dividing the ticket into two columns of stub areas equal in length to one another, said weakened line being off center dividing the ticket into two stub areas one broader than the other, the ticket being more rigid and less bendable in all directions transverse to said weakened line and having smooth transversely extending edges separating successive tickets from one another, each ticket as initially issued corresponding in size to a multiple of transversely extending unit areas corresponding in number to the number of patrons for which the ticket is issued, portions of the ticket being removed at predetermined intervals for controlling the feed of the successive unit areas and indicia on the ticket defining the successive unit areas from one another, the weakened line defining the division along which the ticket is to be separated into its respective stub areas and facilitating separating the ticket along such line into its respective stub areas, said ticket possessing a stiffness in a longitudinal direction sufficient to render it difficult manually to divide its associated set of successive unit areas issued as a ticket without visible evidence of the act of partitioning the ticket.

5. A theatre ticket composed of a shape retaining material and corresponding in size to a multiple of transverse areas corresponding in number to the number of patrons for which the ticket is to be issued having two straight longitudinally extending edges and two straight laterally extending edges interrupted by the bisected portions of feed pin receiving openings, and having a demarcation extending the full length only of the ticket dividing the ticket into two stub areas to define the division along which the ticket is to be torn with feed pin receiving openings intersecting the demarcation at the intersection between successive transverse areas, the ticket being weakened only along the demarcation by a prepared line to facilitate tearing the ticket along such demarcation into its respective stub areas.

6. A theatre ticket composed of a shape retaining material and corresponding in size to a multiple of transverse areas corresponding in number to the number of patrons for which the ticket is to be issued having two straight longitudinally extending edges and two straight laterally extending edges interrupted by the bisected portions of feed pin receiving openings, and having a demarcation extending the full length only of the ticket dividing the ticket into two stub areas to define the division along which the ticket is to be torn with feed pin receiving openings intersecting the demarcation at the intersection between successive transverse areas, the ticket being weakened only along the demarcation by a prepared line intersected by feed pin receiving openings to facilitate tearing the ticket along such demarcation into its respective stub areas.

7. A theatre ticket composed of a shape retaining material and corresponding in size to a multiple of transverse areas corresponding in number to the number of patrons for which the ticket is to be issued, having two straight longitudinally extending edges and two straight laterally extending edges interrupted by the bisected portions of feed pin receiving openings, and having a demarcation extending the full length only of the ticket but off center dividing the ticket into two stub areas one broader than the other to define the division along which the ticket is to be torn with feed pin receiving openings intersecting the demarcation at the intersection between successive transverse areas, the ticket being weakened only along said demarcation by a prepared line to facilitate tearing the ticket along such demarcation into its respective stub areas.

8. A theatre ticket composed of a shape retaining material and corresponding in size to a multiple of transverse areas corresponding in number to the number of patrons for which the ticket is to be issued, having two straight longitudinally extending edges and two straight laterally extending edges interrupted by the bisected portions of feed pin receiving openings, and having a demarcation extending the full length only of the ticket but off center dividing the ticket into two stub areas one broader than the other to define the division along which the ticket is to be torn with feed pin receiving openings intersecting the demarcation at the intersection between successive transverse areas, the ticket being weakened only along said demarcation by a prepared line to facilitate tearing the ticket along such demarcation into its respective stub areas, the broader stub area to be retained by the theatre and the other stub area to be retained by the patron, the stub areas being distinguished from one another by color.

9. A ticket composed of a shape retaining material having two smooth, straight longitudinally extending edges and a weakened line extending only longitudinally of and intermediate said longitudinally extending edges dividing the ticket into two columns of stub areas equal in length to one another, the predominant color on one column being strikingly different from that of the other column, the ticket being more rigid and less bendable in all directions transverse to said weakened line and having smooth, straight, transversely extending edges separating successive tickets from one another, said transversely extending edges being interrupted by the bisected portions of feed pin receiving openings, each ticket as initially issued corresponding in size to a multiple of transversely extending unit areas corresponding in number to the number of patrons for which the ticket is issued, the weakened line defining the division along which the ticket is to be separated into its respective stub areas and facilitating tearing the ticket along such line into its respective stub areas, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have at least three smooth, straight edges to cooperate with the color thereof readily to distinguish one stub area from the other.

10. A ticket composed of a shape retaining material having two smooth, straight longitudinally extending edges and a weakened line extending only longitudinally of and intermediate said longitudinally extending edges dividing the ticket into two columns of stub areas equal in length to one another, the predominant color on one column being strikingly different from that of the other column, the ticket being more rigid and less bendable in all directions transverse to said weakened line and having smooth, straight, transversely extending edges separating successive tickets from one another, each ticket as initially issued corresponding in size to a multiple of transversely extending unit areas corresponding in number to the number of patrons for which the ticket is issued, the weakened line intersected by feed pin receiving openings at the intersection between successive unit areas defining the division along which the ticket is to be separated into its respective stub areas and facilitating tearing the ticket along such line into its respective stub areas, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have three smooth, straight edges and one irregular edge to cooperate with the predominant color thereof readily to distinguish one stub area from the other.

11. A ticket composed of a shape retaining material having two smooth, straight, longitudinally extending edges and a weakened line extending only longitudinally of and intermediate said longitudinally extending edges dividing the ticket into two columns of stub areas equal in length to one another, the predominant color on one column being strikingly different from that of the other column, the ticket being more rigid and less bendable in all directions transverse to said weakened line and having smooth, straight, transversely extending edges separating successive tickets from one another, each ticket as initially issued corresponding in size to a multiple of transversely extending unit areas corresponding in number to the number of patrons for which the ticket is issued, feed pin receiving openings and indicia on the ticket defining the successive unit areas from one another, the weakened line defining the division along which the ticket is to be separated into its respective stub areas and facilitating tearing the ticket along such line into its respective stub areas, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have three smooth, straight edges to cooperate with the predominant color thereof readily to distinguish one stub area from the other.

12. A ticket composed of a shape retaining material having two smooth longitudinally extending edges and a weakened line extending only longitudinally of and intermediate said longitudinally extending edges dividing the ticket into two columns of stub areas equal in length to one another, the predominant color on one column being strikingly different from the predominant color on the other column, the ticket being more rigid and less bendable in all directions transverse to said weakened line and having smooth transversely extending edges separating successive tickets from one another, each ticket as initially issued corresponding in size to a multiple of transversely extending unit areas corresponding in number to the number of patrons for which the ticket is issued, portions of the ticket being removed at predetermined intervals for controlling the feed of the successive unit areas and indicia on the ticket defining the successive unit areas from one another, the weakened line defining the division along which the ticket is to be separated into its respective stub areas and facilitating separating the ticket along such line into its respective stub areas, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have at least three smooth edges to cooperate with the color thereof readily to distinguish one stub area from the other.

13. A theatre ticket composed of a shape retaining material having too smooth, straight longitudinally extending edges and a weakened line extending only longitudinally of and intermediate said longitudinally extending edges dividing the ticket into two columns of stub areas equal in length to one another, the predominant color on one column being strikingly different from that of the other column, the ticket being more rigid and less bendable in all directions transverse to said weakened line and having smooth, straight, transversely extending edges separating successive tickets from one another, said transversely extending edges being interrupted by the bisected portions of feed pin receiving openings, each ticket as initially issued corresponding in size to a multiple of transversely extending unit areas corresponding in number to the number of patrons for which the ticket is issued, the weakened line defining the division along which the ticket is to be separated into its respective stub areas and facilitating tearing the ticket along such line into its respective stub areas, one stub area to be reserved for the theatre and the other for the patron, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have at least three smooth, straight edges to cooperate with the color thereof readily to distinguish one stub area from the other.

14. A theatre ticket composed of a shape retaining material having two smooth, straight longitudinally extending edges and a weakened line extending only longitudinally of and intermediate said longitudinally extending edges dividing the ticket into two columns of stub areas equal in length to one another, the predominant color on one column being strikingly different from that of the other column, the ticket being more rigid and less bendable in all directions transverse to said weakened line and having smooth, straight, transversely extending edges separating successive tickets from one another, each ticket as initially issued corresponding in size to a multiple of transversely extending unit areas corresponding in number to the number of patrons for which the ticket is issued, the weakened line intersected by feed pin receiving openings at the intersection between successive unit areas defining the division along which the ticket is to be separated into its respective stub areas and facilitating tearing the ticket along such line into its respective stub areas, one stub area to be reserved for the theatre and the other for the patron, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have three smooth, straight edges and one irregular edge to cooperate with the predominant color thereof readily to distinguish one stub area from the other.

15. A theatre ticket composed of a shape retaining material having two smooth, straight, longitudinally extending edges and a weakened line extending only longitudinally of and intermediate said longitudinally extending edges dividing the ticket into two columns of stub areas equal in length to one another, the predominant color on one column being strikingly different from that of the other column, the ticket being more rigid and less bendable in all directions transverse to said weakened line and having smooth, straight, transversely extending edges separating successive tickets from one another, each ticket as initially issued corresponding in size to a multiple of transversely extending unit areas corresponding in number to the number of patrons for which the ticket is issued, feed pin receiving openings and indicia on the ticket defining the successive unit areas from one another, the weakened line defining the division along which the ticket is to be separated into its respective stub areas and facilitating tearing the ticket along such line into its respective stub areas, one stub area to be reserved for the theatre and the other for the patron, said ticket possessing a stiffness in a longitudinal direction sufficient to render it difficult manually to divide its associated set of successive unit areas issued as a ticket without visible evidence of the act of partitioning the ticket, whereby when an associated set of successive unit areas issued as a ticket is divided into its respective stub areas, each stub area will have three smooth, straight edges to cooperate with the predominant color thereof readily to distinguish one stub area from the other.

BENJAMIN H. FREEDMAN.